United States Patent [19]
Vellenga et al.

[11] Patent Number: 5,294,840
[45] Date of Patent: Mar. 15, 1994

[54] ADJUSTABLE CYCLE TIMER FOR LIVEWELL BAIT PUMPS AND SUCH

[76] Inventors: David G. Vellenga, 7124 Mill Ridge Rd., Raleigh, N.C. 27613; John K. Standish, 6023 Grandale Dr., Durham, N.C. 27713

[21] Appl. No.: 969,997

[22] Filed: Nov. 2, 1992

[51] Int. Cl.$^5$ ............ C02F 11/02; F04B 49/02; A01K 97/00
[52] U.S. Cl. ............ 307/141; 318/474; 318/484; 43/56; 210/94
[58] Field of Search ............ 307/140, 141; 43/56, 43/55, 57; 361/160–169; 261/121.2, 151; 119/5; 210/94; 318/484, 474

[56] References Cited

U.S. PATENT DOCUMENTS

| 5,057,213 | 10/1991 | Reid et al. | 210/94 |
| 5,076,763 | 12/1991 | Anastos et al. | 318/474 |
| 5,172,511 | 12/1992 | Smith et al. | 43/56 |

Primary Examiner—Paul Ip

[57] ABSTRACT

An adjustable cycle timer that controls on and off cycling of a livewell bait pump or similar device. The on time and off time of the cycle are each independently variable by adjusting the frequency of frequency generators, one generator (10) for on time and one generator (14) for off time in the cycle. The outputs of these frequency generators are gated to the clock input of a frequency divider (20), the output of which controls a relay driver (30) or similar device that switches the pump motor or other device to be controlled. When the output (22) of the frequency divider (20) changes state, a feedback switching circuit (29) blocks the output of one of the frequency generators, and gates the output of the other frequency generator to the input of the frequency divider (20). This allows the length of the on time segment of the cycle to be controlled by the frequency of one of the frequency generators, while the length of the off time segment of the cycle is controlled by the other frequency generator.

1 Claim, 2 Drawing Sheets

ADJUSTABLE CYCLE TIMER FOR LIVEWELL BAIT PUMPS AND SUCH

BACKGROUND OF THE INVENTION

1. Field of the Invention

This invention relates to electronically controlled on/off cycling of pumps and such in which the ability to set the cycle over wide ranges for on-time, off-time, and total time of one cycle is desirable.

2. Description of the Related Art including information disclosed under 37 C.F.R. Sections 1.97–1.99

Fishermen often carry various kinds of live bait which are kept alive in a "livewell," filled with fresh or salt water, as appropriate. In order to keep the bait alive and fresh, the water in the livewell must be refreshed. If the livewell is in a boat, this is sometimes done by pumping in water from outside the boat into the livewell, and expelling the old water. Another technique is to use an aerator to maintain proper gas balance within the livewell.

Most frequently, the livewell pump is simply left on constantly, and the only form of control is for the operator to turn it on and off manually. Leaving the pump on continuously rapidly drains the battery that runs the pump. This is a particularly serious problem for offshore marine fishermen, who may use an engine-starting storage battery for this purpose. This means the operator must use care not to discharge the battery to the point where the engine cannot be restarted, or else must idle the engine to keep the battery charged. Idling the engine not only consumes gasoline, but also may disturb the fishing in the area of the boat.

Fishermen have also discovered that various kinds of live bait require different levels of water quality in the livewell. Menhaden, for instance, are very sensitive to poor water quality and require frequent replenishment, whereas live shrimp are quite hardy, and will survive well with infrequent aeration and/or replenishment of the water in the livewell.

For these two reasons, an automatic control system that will control the pump that maintains water quality in the livewell is needed. It should allow for just enough pump operation to maintain water quality for the specific live bait in the livewell, but no more. In so doing, it will make most efficient use of the battery.

There are such control devices on the market, but they have serious limitations. One such device has a fixed cycle time of 15 minutes, and the operator may set the on-time up to 7½ minutes. The remainder of the 15 minute cycle constitutes the off-time. While this will work for some situations, it would not allow (for instance) for 2 minutes on, 28 minutes off, which would be adequate for some situations, depending on pumping speed, the livewell capacity, and type of live bait.

A second such device offers a fixed on-time of 30 seconds, whereas the off-time is adjustable from 90 seconds to 5 minutes. Again, this is too limited a range of control. For many applications, each time the pump is on, a complete change of the livewell water is desirable. Depending on the livewell capacity and the pumping speed, 30 seconds may be completely inadequate to provide for one complete change.

The devices of which we are aware limit themselves to resistive/capacitive elements to provide the timing function. Since long time delays are sometimes desired, the large capacity capacitors needed are both expensive, and (when electrolytics) are subject to current leakage and breakdown, particularly in the high stress environment of a boat.

Our device uses a frequency divider with a feedback switching circuit, and we believe our usage is a unique improvement over the prior art. U.S. Pat. No. 4,958,228 to Kutsuki (1990) for an Automatic Frequency Change Device, does have two oscillators, the output of one of which is switched to the input of a frequency divider. But the switch is not really a feedback switch which enables operation in an astable mode, but rather the circuit samples an input signal to set the switch one way or the other. Another difference is, of course, the application; the Automatic Frequency Change Device applies to the sensing and gating of different types of video signals.

U.S. Pat. No. 3,938,009 to Gauthier (1974) for Precision Control of Relay Operate and Release Timer is for a different application, which is to control very short time delays in the operating and/or releasing of a relay, based on a fixed frequency clock, and an input control signal for the switching of the relay. Our invention is in contrast an astable, cycling control, rather than one that depends on an external signal to operate or release the relay. In addition, in our device the clock signals are adjustable in frequency.

Frequency divider integrated circuits are rated on how high a frequency they can handle. We believe one unique use of the frequency divider in our system is its use at low, audio level frequencies. Our interest is not in how fast a signal it can handle, but in its ability to count large numbers of cycles before the output changes state. A relatively high frequency controlled signal, which uses a small capacitor for timing, can be fed into the frequency divider, and the larger the number of cycles it counts, the longer it will delay before its output changes state. This long delay is thus accomplished by a small, reliable, compact integrated circuit, rather than a large capacitor.

OBJECTS AND ADVANTAGES

Accordingly, several of the objects and advantages of our invention are:

(a) to provide a means of setting the on-time of the operating cycle which will cover a wider range than current controllers provide.

(b) to provide a means of setting the off-time of the operating cycle which will cover a wider range than current controllers provide.

(c) to provide a means to make the setting of the on-time and off-time segments independent of each other, so that total cycle time is the sum of the independently set on-time and off-time segments.

(d) to provide such a wide range of settings that the same controller can provide maximum efficiency given variations in pumping speed, livewell capacity, and type of live bait, as well as other variables.

(e) to base the time-delay for the entire cycle on means other than an R/C circuit alone, thereby avoiding the size, cost, and unreliability of large capacitors.

Further objects and advantages will become apparent from a consideration of the ensuing description and drawings.

SUMMARY OF THE INVENTION

Accordingly, the reader will see that the invention will provide easily adjustable control of the on and off time of a livewell pump control, allowing a wide range of adjustments for a variety of pumping speeds, livewell capacity, and type of live bait.

It also provides linear control of the time of the cycle segments which are set completely independently of each other.

It also allows wide timing ranges with small, inexpensive, yet durable capacitors.

There also may be situations in which it may desireable to use different components for the frequency generators. A more limited range of on time may be all that is needed, whereas a longer off cycle control range would be desired. There may also be ways of using discrete elements to generate the output frequency, instead of the integrated 555 type timer.

Frequency-dividers/ripple counters can come in a variety of configurations, with outputs that divide the input signal by various amounts, and there may be some situations in which other divisors than 16,384 may be more appropriate. Where much longer timing cycles are desired, another ripple counter/frequency divider 20 could be added, cascaded on to the one described. Timing cycles could be increased exponentially, and it would involve the addition of another frequency divider, rather than a large, expensive, timing capacitor.

Further, while this timer was designed to deal with the unique problems that a livewell control device must handle, there could be other processes in different areas which need such a means of control, and this device would be useful in those areas as well.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

Figure 1:
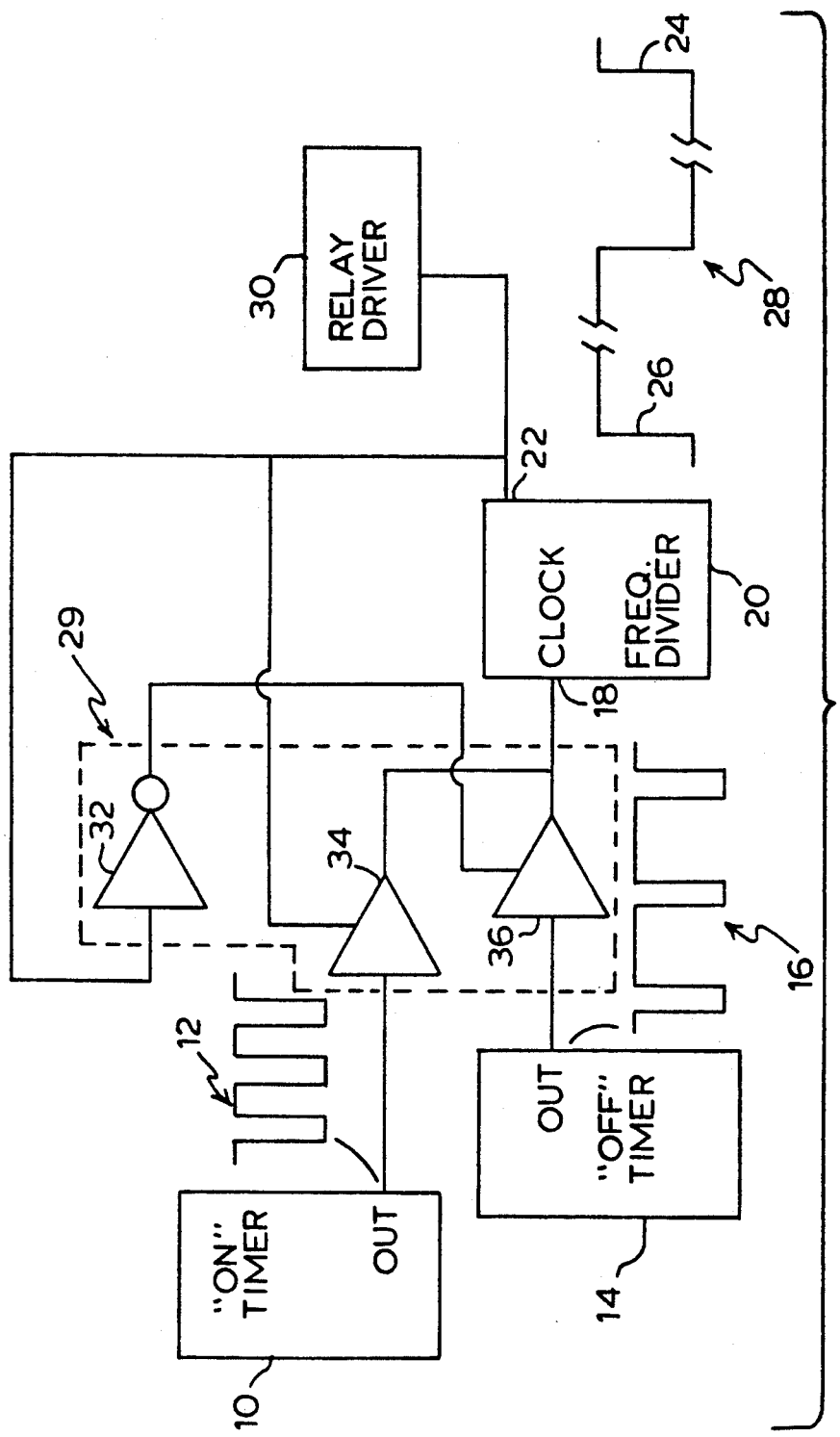
FIG. 1 shows a block diagram of the circuit.

REFERENCE NUMERALS IN DRAWINGS 10 frequency generator whose output frequency is set by the operator
12 output waveform of frequency generator 10
14 frequency generator whose output frequency is set by the operator
16 output waveform of frequency generator 14
18 clock input of frequency divider
20 frequency divider
22 output of frequency divider
24 "low" or "off" segment of output waveform of frequency divider
26 "high" or "on" segment of output waveform of frequency divider
28 output waveform of frequency divider
29 feedback switching circuit
30 relay driver (on and off switching means)
32 inverting buffer
34 non-inverting tri-state buffer
36 non-inverting tri-state buffer
40 555 type timer integrated circuit
42 555 type timer integrated circuit
44 timing capacitor
46 timing capacitor
48 pnp transistor
50 pnp transistor
52 potentiometer
54 potentiometer

DESCRIPTION OF THE PREFERRED EMBODIMENTS

A typical embodiment of the present invention would be an electronic circuit fabricated on a printed circuit board or such with appropriate wires to a power source and to the pump or other device to be controlled.

Operation—FIG. 1

In FIG. 1, the "on" timer 10 is a frequency generator. The frequency that it generates 12 is set by the operator. The "off" timer 14 is a similar frequency generator, with its frequency output 16 set independently by the operator.

These frequency generators alternately drive the clock input 18 of a frequency-divider 20, which generates an output waveform 28.

This output waveform drives a feedback switching circuit 29 which operates as follows: When output 22 of the frequency-divider 20 is high 26, the tri-state buffer 34 which gates the output 12 of the "on" timer 10 will be enabled, and so the "on" timer frequency 12 will be gated to the clock input 18 of the divider. After a set number of cycles of waveform 12, the output 22 of the divider 20 will change to low 24, and at that point, tri-state buffer 34 will be disabled. At the same moment, the inverter 32, which is also driven by the output 22 of the divider 20, will enable the other tri-state buffer 36. This buffer will then gate the output 16 of "off" timer 14 to the input 18 of the frequency divider 20. After the same set number of cycles of 16, the output 22 of the divider 20 will go high, and the whole cycle is repeated.

The net result is an output waveform 28. The "on" segment 26 of the output waveform 28 will have a time length that is a product of the period of the output 12 of the "on" timer 10 times ½ the setting of the frequency divider 20. Likewise, the time length of the "off" segment 24 of the output cycle 28 will have a time length equal to the product of the period of the signal 16 generated by the "off" timer 14 that multiplied by ½ the setting of the frequency-divider 20. The output 22 then cycles the relay driver 30 on and off.

FIG. 2

Figure 2:
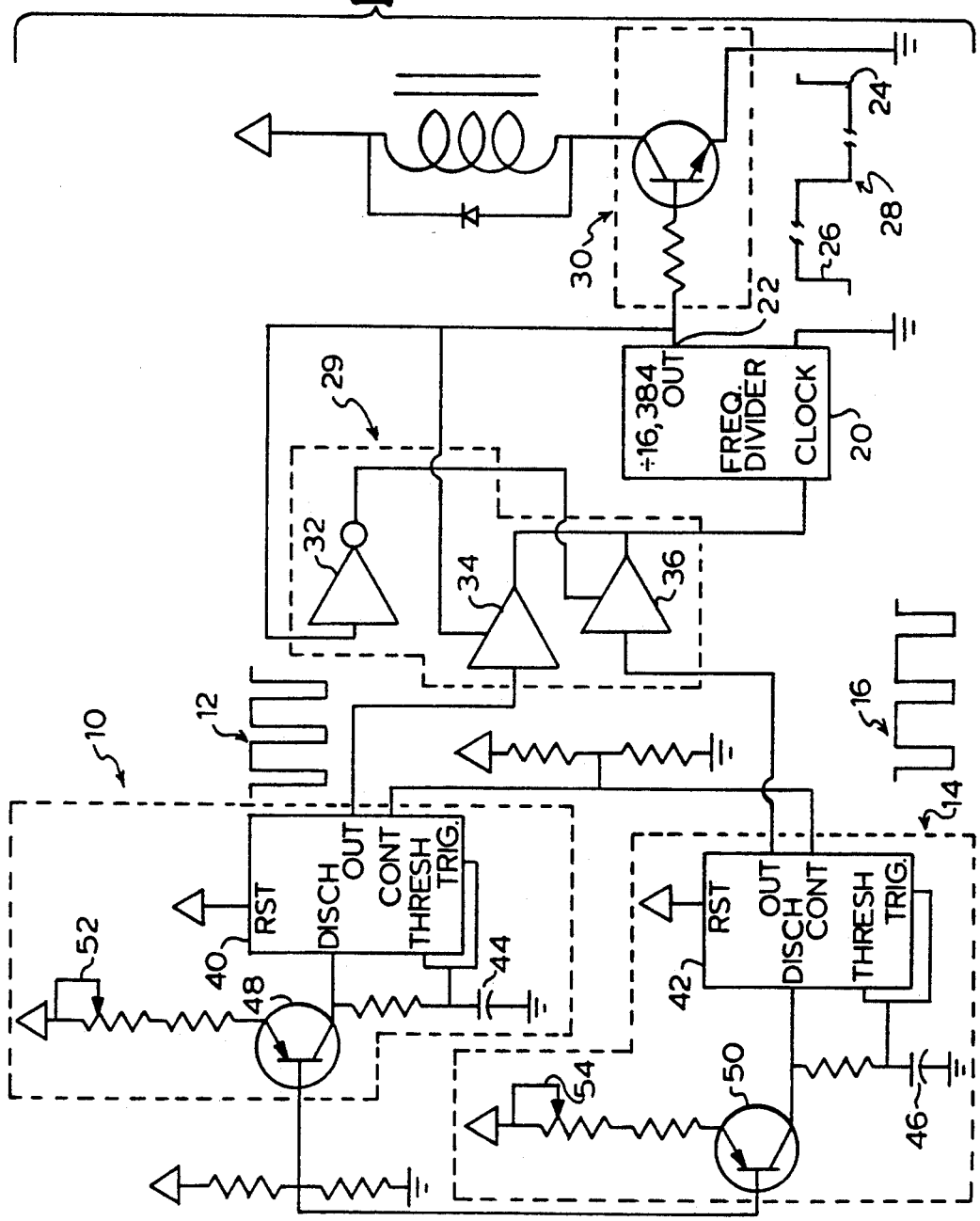
FIG. 2 shows a more detailed schematic of the circuit.

FIG. 2 illustrates one practical configuration of the invention. A 4020 CMOS 14 stage ripple counter could be used for the frequency-divider 20, and a 4503 non-inverting tri-state buffer for 34 and 36. Two 555 timers 40 and 42 are configured in astable mode. The output frequency of each timer is controlled, as is known, by the charging rate of the timing capacitors 44 and 46. In this particular configuration, the charging current to the capacitors is controlled by a constant current source provided by the transistors 48 and 50. This current is controlled, in turn, by adjusting the potentiometers 52 and 54.

The output 22 of the frequency-divider 20 is the "divide by 16,384" output. If the frequency of the output 12 of the "on" timer is 125 Hz, the divider 20 will count 8,192 cycles of that signal, and then change the output 22 to "off" (low) 24. It will have been in its high state 26 for 65.5 seconds. If the output 16 of the "off" timer is 2 Hz, then the divider 20 will count 8,192 cycles of that signal, and then change its output 22 back to "on" (high) 26. It will have been in its low state 24 for 4,095 seconds, or about 68 minutes. The 65.5 second "on" time will be repeated, and so on, until the frequency generator settings are changed by the operator.

If one uses a small, 0.22 microfarad capacitor for capacitors 44 and 46, and uses a large resistance value for the potentiometers 52 and 54 such as 1 Megaohm, it is easily possible to have a frequency output range from each timer ranging from around 160 Hz to 1.6 Hz, or almost a 100 to 1 control range. If the "divide-by-16,384" output is used in the divider 20, either, or both, of the "on" time and the "off" time of the output cycle 28 could be as short as 51 seconds or as long as 85 minutes, whichever the operator chooses. Thus long time delays are provided, easily and precisely controlled by the operator, and the timing capacitors are no larger than 0.22 microfarads.

We claim:

1. An adjustable cycle timer for cycling on and off of livewell pumps and other switchable devices in which the on time length and off time length of the on and off cycle are independently adjustable, comprising:
    (a) a frequency divider means with an output which controls an on and off switching means;
    (b) a feedback switching means, by which the input to said frequency divider means is switched when the output waveform of said frequency divider means changes state;
    (c) a first means for frequency generation and control with an output which is switched by said feedback switching means to the input of said frequency divider means when the output waveform of said frequency divider means is in a high or on state;
    (d) a second means for frequency generation and control, the output of which is switched to the input of said frequency divider means by said feedback switching means when the output waveform of said frequency divider means is in a low or off state.

* * * * *